United States Patent
Gavillet et al.

(10) Patent No.: US 11,432,674 B2
(45) Date of Patent: Sep. 6, 2022

(54) DISPENSER WITH PARALLEL DISPENSING PATHS

(71) Applicant: SOCIETE DES PRODUITS NESTLE S.A., Vevey (CH)

(72) Inventors: Gilles Gavillet, Ursy FR (CH); Peter Moeri, Gummenen (CH)

(73) Assignee: Societe des Produits Nestle S.A., Vevey (CH)

(*) Notice: Subject to any disclaimer, the term of this patent is extended or adjusted under 35 U.S.C. 154(b) by 0 days.

(21) Appl. No.: 16/488,331

(22) PCT Filed: Feb. 26, 2018

(86) PCT No.: PCT/EP2018/054637
§ 371 (c)(1),
(2) Date: Aug. 23, 2019

(87) PCT Pub. No.: WO2018/158179
PCT Pub. Date: Sep. 7, 2018

(65) Prior Publication Data
US 2019/0387918 A1    Dec. 26, 2019

(30) Foreign Application Priority Data

Feb. 28, 2017 (EP) .................................... 17158383
Feb. 28, 2017 (EP) .................................... 17158397

(51) Int. Cl.
*A47J 31/36* (2006.01)
*A47J 31/40* (2006.01)
(Continued)

(52) U.S. Cl.
CPC ....... *A47J 31/3623* (2013.01); *A47J 31/0652* (2013.01); *A47J 31/3604* (2013.01);
(Continued)

(58) Field of Classification Search
CPC ........ A47J 31/0652; A47J 31/34; A47J 31/36; A47J 31/3604; A47J 31/3623; A47J 31/3633
(Continued)

(56) References Cited

U.S. PATENT DOCUMENTS 8,250,971 B2*  8/2012  Righetti ................ A47J 31/469
                                                          99/302 P
8,973,489 B2   3/2015  Baudet et al.
(Continued)

FOREIGN PATENT DOCUMENTS

CN    202234830 U   5/2012
CN    202269899 U   6/2012
(Continued)

*Primary Examiner* — Reginald Alexander
(74) *Attorney, Agent, or Firm* — K&L Gates LLP

(57) ABSTRACT

A beverage preparation machine (1) has: a water circuit (12,13) for guiding water (2,2',2") from a source (11); and a mixing unit (20) fluidically connected to the water circuit (12,13) and to a beverage outlet (23) for dispensing to a consumer cup or mug (5) a beverage (3) formed in the mixing unit (20). The mixing unit (20) has a first module (21) and a second module (22) that are relatively movable from: a distant configuration for inserting an ingredient between the first and second modules (21,22); to a proximate position for combining such ingredient with water (2') supplied by the water circuit (12,13) so as to form the beverage (3). The machine has: a further unit (30) fluidically connected to the water circuit (12,13) and to an outlet (33) for dispensing to a consumer cup or mug water (2") supplied by the water circuit (12,13); and a water directing device (14) fluidically connected to the water circuit (12,13), to the mixing unit (20) and to the further unit (30). The directing device (14) has one or more valves (141,142;143,144) that is/are actuated by the relatively moving first and/or second modules (21,22) and that can be opened and closed for (Continued)

controlling a flow of water (2,2',2") from the water circuit (12,13) selectively to the mixing unit (20) or to the further unit (30).

16 Claims, 2 Drawing Sheets

(51) Int. Cl.
*A47J 31/06* (2006.01)
*A47J 31/44* (2006.01)
*A47J 31/46* (2006.01)

(52) U.S. Cl.
CPC ......... *A47J 31/3633* (2013.01); *A47J 31/407* (2013.01); *A47J 31/0673* (2013.01); *A47J 31/4482* (2013.01); *A47J 31/46* (2013.01); *A47J 2201/00* (2013.01)

(58) Field of Classification Search
USPC ..................................... 99/289 R, 302 P, 295
See application file for complete search history.

(56) References Cited

U.S. PATENT DOCUMENTS

| | | | |
|---|---|---|---|
| 9,700,171 | B2 | 7/2017 | Hanneson et al. |
| 9,980,597 | B2 | 5/2018 | Mori |
| 2006/0196362 | A1* | 9/2006 | Mariller .............. A47J 31/0652 99/279 |
| 2014/0178546 | A1 | 6/2014 | Besson et al. |
| 2014/0326361 | A1 | 11/2014 | Larzul et al. |
| 2014/0352544 | A1 | 12/2014 | Yoakim et al. |
| 2017/0007066 | A1 | 1/2017 | Bonacci et al. |
| 2017/0325619 | A1* | 11/2017 | Holten ................ A47J 31/3628 |
| 2017/0367518 | A1* | 12/2017 | Anthony ............. A47J 31/0652 |

FOREIGN PATENT DOCUMENTS

| | | |
|---|---|---|
| EP | 1764014 | 3/2007 |
| EP | 2119386 | 11/2009 |
| EP | 2353469 | 8/2011 |
| WO | 2004041039 | 5/2004 |
| WO | 2011147796 | 12/2011 |
| WO | 2017001644 A1 | 1/2017 |

* cited by examiner

DISPENSER WITH PARALLEL DISPENSING PATHS

CROSS REFERENCE TO RELATED APPLICATIONS

The present application is a National Stage of International Application No. PCT/EP2018/054637, filed on Feb. 26, 2018, which claims priority to European Patent Application No. 17158383.4, filed on Feb. 28, 2017, and European Patent Application No. 17158397.4, filed on Feb. 28, 2017, the entire contents of which are being incorporated herein by reference.

FIELD OF THE INVENTION

The field of the invention pertains to machines for dispensing water and for preparing and dispensing beverages. In particular, the beverage can be prepared by circulating water through a flavouring ingredient, in particular supplied within a capsule.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Machines for producing beverages such as coffee, tea, chocolate, cacao, soup, with or without milk are well known in the art.

For instance, EP 1 764 014, EP 1 900 312 and EP 2 571 407 disclose coffee machines having a water circuit with an outlet for delivering hot water and/or steam. EP 097 481 discloses another beverage preparation machine having a steam outlet and a hot water outlet.

DE 196 11 450, EP 0 607 759, EP 1 501 398, EP 1 776 905, WO 2007/09577 disclose air-steam lances for immersion into a milk cup.

WO 2008/034708 discloses a coffee machine having a coffee outlet and a steam outlet that can be brought into a position for the delivery of fluid into the same user-cup, the coffee outlet being horizontally movable to the steam outlet.

U.S. Pat. No. 6,293,187 discloses a steam pipe that is vertically displaceable for automatically moving its outlet in a cup for frothing milk contained therein.

Machines that are configured to deliver a beverage and deliver water as such, e.g. water and/or steam, may include a dispensing outlet for the delivery of water (liquid and/or steam) that is separate from the beverage dispensing outlet, typically for hygiene reasons. The machine's fluid circuit is normally connected to a source of water, e.g. a water tank or directly to an outlet of a city water distribution network. The fluid circuit is then typically split between a beverage preparation and dispensing unit on the one hand and a water dispensing outlet on the other hand. One or more valves may be used to direct the water to the beverage module and/or to the water dispensing outlet. Examples of such fluid systems are illustrated in EP1764014 and WO2011/095502.

There is still a need to provide a simple hot water and/or steam dispensing arrangement associated with a beverage dispensing arrangement.

SUMMARY OF THE INVENTION

The invention thus relates to a machine for preparing a beverage.

The beverage machine can be an in-home or out of home machine. The beverage machine can be for the preparation of coffee, tea, chocolate, cacao, milk, soup, baby food, etc . . . .

The machine can be electrically powered, typically by the mains, via an electric cord.

The beverage machine may be arranged for preparing within a beverage preparation module a beverage by passing hot or cold water or another liquid through a capsule containing an ingredient, such as a flavoring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . In particular, a coffee machine may be configured for dispensing espressos, e.g. an adjustable volume of 20 to 60 ml per serving, and/or for dispensing lungos, e.g. a volume in the range of 70 to 150 ml per serving.

Examples of beverage machine with such a main body are illustrated in WO 2009/074550, WO 2010/003932, WO 2016/156364 and WO 2017/001644.

The machine has a water circuit for guiding water from a source. The machine may be connected to a water tank or to an external water supply pipe (normally connected to a city water distribution network) as a source of water. Examples of such water circuits are disclosed in the above references.

The water circuit may include at least one of a liquid driver, e.g. a pump, and a thermal conditioner, e.g. a heater and/or a cooler. For instance, the water circuit has a pump fluidically connected to a heater for driving water from a heater inlet to a heater outlet via a heating duct.

Examples of liquid drivers and their integration into a beverage machine are disclosed in WO 2009/150030, WO 2010/006953, WO 2010/108700 and EP16177217.3.

Examples of thermal conditioners are disclosed in CH 593 044, DE 103 22 034, DE 197 32 414, DE 197 37 694, EP 0 485 211, EP 1 253 844, EP 1 380 243, EP 1 809 151, FR 2 799 630, U.S. Pat. Nos. 4,242,568, 4,595,131, 5,019,690, 5,392,694, 5,943,472, 6,393,967, 6,889,598, 7,286,752, WO 01/54551, WO 2004/006742, WO 2009/043851, WO 2009/043865, WO 2011/157675.

The machine has a mixing unit fluidically connected to the water circuit and to a beverage outlet for dispensing to a consumer cup or mug a beverage formed in the mixing unit. The mixing unit has a first module and a second module that are relatively movable from:
- a distant configuration for inserting an ingredient between the first and second modules; to
- a proximate position for holding such ingredient between the first and second modules and combining such ingredient with water supplied by the water circuit to the mixing unit so as to form the beverage.

Example of mixing units are disclosed in WO 2005/004683, WO 2007/135135, WO2007/135136, WO 2008/037642, WO 2013/026843, WO 2013/026845 and WO 2013/037783.

Adjacent to the mixing unit, the machine may have a collector for waste material, e.g. residual liquid and/or used flavouring ingredient, e.g. ground coffee or tea upon use, for instance contained within capsules. The collector may be positioned underneath the mixing unit to collect upon beverage preparation the used flavouring ingredient evacuated to the collector, e.g. by gravity. Suitable collectors are for example disclosed in WO 2009/074559 and in WO 2009/135869, which are hereby incorporated by way of reference.

The cup or mug may be positioned in a dispensing area that can be external to the machine or to a machine's main body. The dispensing area may be located within a machine's main body or on a part connected to the machine's main body.

Examples of dispensing areas for cups or mugs are disclosed in
EP 0 549 887, EP 1 440 639, EP 1 731 065, EP 1 867 260, U.S. Pat. Nos. 5,161,455, 5,353,692, WO 2006/050769, WO 2009/074557, WO 2009/074559, WO 2009/135869, WO 2011/154492, WO 2012/007313, WO 2013/186339, WO 2016/096705, WO 2016/096706 and WO 2016/096707.

The machine incorporates a further unit fluidically connected to the water circuit and to an outlet for dispensing to a consumer cup or mug water, as such or in combination with an ingredient, supplied by the water circuit via the further unit, such as via a pipe of the further unit leading to the outlet.

The outlet of the further unit may be different to the outlet of the mixing unit, e.g. to prevent cross-contamination and/or to dispense water to a cup or mug located at a different location than for the dispensing of beverage. Alternatively, the outlet of the further unit and the outlet of the mixing unit may be the same outlet.

Examples of such outlets of further units and their integration into a beverage machine are disclosed in WO 2011/095502 and WO 2011/144722.

The machine further includes a water directing device fluidically connected to the water circuit, to the mixing unit and to the further unit. The water directing device has one or more valves that can be opened and closed for controlling a flow of water from the water circuit selectively into an inlet of the mixing unit or into an inlet of the further unit.

The water directing device can be controlled to direct the flow of water alternatively to the mixing unit or to the further unit. The water directing device can be controlled to direct the flow of water both to the mixing unit and to the further unit, or to none of the mixing unit and further unit.

The first module and the second module may be relatively movable, by a motor and/or a handle, via a transmission such as a transmission comprising at least one of a toothed gear, lever and belt transmission element.

Examples of motion systems for the first and second modules are disclosed in WO 2005/004683, WO2007/135136, WO 2007/135135, WO 2009/043630, WO 2012/025258 and WO 2013/127476.

The machine may include a main body, e.g. delimited by an outside housing that contains, entirely or predominantly, one or more of the mixing unit, the further unit, the directing device and the water circuit.

In accordance with the invention, at least one of the first and second modules, by relatively moving between the distant and the proximate configurations, actuates the valve(s) to direct the flow of water selectively into at least one of the inlet of the mixing unit and the inlet of the further unit.

Hence, the relative movement (or relative position) of the first and second modules is linked to the operation of the directing device's valve(s) to direct the flow of the water delivered by the water circuit to the mixing unit and/or to the further unit.

The machine can have an electric control unit, in particular comprising a printed circuit board (PCB), for receiving instructions from a user via an interface and for controlling the water circuit and, when motorized, the relative movement of the first and second modules. For instance, the machine has one or more electric sensors for sensing at least one operational characteristic the water source, the water circuit, the directing device, the mixing unit and the further unit, and for communicating such characteristic(s) to the control unit.

The water directing device can be configured to direct the flow of water:
- only into the inlet of the mixing unit when the first and second modules are in their proximate configuration and only into the inlet of the further unit when the first and second modules are in their distant configuration; or
- into the inlet of the mixing unit, and optionally into the inlet of the further unit, when the first and second modules are in their proximate configuration and only into the inlet of the further unit when the first and second modules are in their distant configuration.

Hence, a flavoured beverage machine can be combined with a water outlet, e.g. to dispense (unflavoured) hot water or steam. It is also possible to associate a unit for preparing a flavoured beverage of a first type with a further unit for preparing a flavoured beverage of a different type, whereby the flow of water is directed according to the state of one of the units, i.e. depending on whether the first and second modules of one of the units are in the proximate or in the distance configuration. The first type of beverage and the different type of beverage being for instance selected from tea, coffee, chocolate, cacao, milk and soup.

The water directing device may include a selector that operates the valve(s) for opening and/or closing it, the selector being actuated by at least one of the first and second modules when relatively moving between the distant and the proximate configurations.

For instance, a module moves against the selector, or the directing device with the selector is moved against a module, or the module and the selector with directing device are both moved against each other.

The selector can be associated with a return spring for automatically returning the selector into a position to open or close the valve(s).

The mixing unit and the further unit can have different flow-through resistances, the valve of the directing device opening and closing the inlet of the unit with the lower flow-through resistance so that, when the valve is open, water from the water circuit is predominantly directed, e.g. at least almost exclusively directed, into the inlet of the unit with the lower flow-through resistance.

The unit with the higher flow-through resistance, e.g. the mixing unit, can have an upstream control valve, such as a check-valve or an anti-return valve of backpressure valve, which enables a flow therethrough of water from the water circuit when the control valve is exposed to an upstream-downstream differential valve pressure that exceeds a threshold value, such as a value above 0.2 bar, for instance a value in the range of 0.3 to 15 bar, e.g. 0.5 to 3 bar or 5 to 12 bar. Optionally, the control valve includes a gate and a resilient element, e.g. a spring, that urges the gate into a position sealing an upstream passage into the unit with the higher flow-through resistance.

When the flow of water from the water circuit is used merely as a dispensable liquid to the user, the control valve may have a low threshold value, e.g. in the range of 0.3 to 1 or 2 or 3 bar. This may correspond to a configuration of a backpressure of a back pressure valve as disclosed in WO2007/135136.

When the flow of water from the water circuit is (also) used as a hydraulic fluid, e.g. for fine positioning or sealing of the first and/or second modules, the control valve may have a high threshold value, e.g. in the range of 3 to 15 bar, e.g. 4 to 12 such as 5 to 10 bar. The high threshold value then serves to ensure that the hydraulic fluid is pressurised and works accordingly. This may correspond to a check valve configuration as disclosed in WO 2011/042400.

Of course, when the flow of water from the water circuit is (also) used as a hydraulic fluid downstream the control valve, then the control valve cannot serve to ensure that the hydraulic fluid is pressurised after the control valve. In such a situation, a high threshold value cannot serve such a purpose. This may correspond to a configuration downstream the spring-biased valve disclosed in the above cited references as well as in WO 2009/115474.

If the valve of the directing device opens and closes the inlet of the further unit, the mixing unit can be associated with a mixing unit valve, the water directing device being configured to maintain, e.g. maintain mechanically, the mixing unit valve closed when the valve of the directing device is opened so that the inlet of the further unit is open. The mixing unit valve can be the same valve as the above upstream control valve (when present).

The directing device can have a body that is movable from:
  a mixing unit position to bring or maintain the mixing unit valve in the closed position and enable the valve) of the directing device to be in or move into the open position, optionally the body mechanically acting directly on the mixing unit valve to maintain it in the closed position; to
  a further unit position to bring or maintain the valve of the directing device in the closed position and enable the mixing unit valve to be in or move into the open position, optionally the body mechanically acting directly on the valve of the directing device to maintain it in the closed position, and/or vice versa.

The body of the directing device can have a part that maintains the mixing unit valve and that maintains the valve of the directing device, the part of the body being an integral part or being made of multiple sub-parts mechanically fixed together.

The body of the directing device may be pre-constrained in the mixing unit position and/or in the further unit position, by at least one of a monostable spring element and a bistable spring element.

The above selector (when present) can be configured to act on the body of the directing device. For instance, the selector is integral with or fixed to or urged against the body.

The first module and the second module may delimit in the proximate position a chamber for holding a capsule containing an ingredient to be mixed in the so delimited chamber with water supplied from the water circuit to form the beverage. For instance, the first module has at least one piercing element for opening such capsule so as to enable or facilitate a passage of the water into such capsule and/or the second module has at least one piercing element or tearing-open element for forming an opening in such capsule so as to enable or facilitate an outflow from such capsule of beverage produced by mixing the capsule's ingredient with water.

Example of piercing elements and their incorporation into a mixing unit are disclosed in WO02/00073, WO 2013/026845, WO 2014/076041 and WO 2015/022345.

Examples of tearing elements and their incorporation into a mixing unit are disclosed in EP0512468, EP0512470, WO 2011/113854 and WO2013/026843.

The first module can be hydraulically and/or resiliently movable against the second module. Such a movement can be provided to eliminate a play when the first and second modules are in the proximate position.

The first module can be movable against the second module in a support element, e.g. in a hydraulic cage, by a hydraulic fluid, such as water supplied by the water circuit to the first module.

The first module can be movable against the second module by a spring element, such as a helicoidal spring, mounted on a support element, e.g. a guiding cage, against the first module.

The first module can be movable against the second module by both such hydraulic fluid in the corresponding support element and such spring element on the corresponding support element. For instance, the support element corresponding to the hydraulic fluid and the support element corresponding to the spring element form a single element, e.g. an integral element or an element of sub-parts mechanically fixed together. An example of such an architecture are disclosed in WO 2009/115474 and WO 2009/130099.

The water directing device and the first module or the second module can be mechanically assembled together directly or indirectly via a common support element. The above support element associated with the hydraulic fluid and/or the spring element (when present) may form such common support element.

The first or second module can be a downstream module configured to supply the beverage along a guide to the beverage outlet via an outlet chamber. The outlet chamber may have a partition wall delimiting a principal beverage passage and an overflow beverage passage such that: a low flow of beverage is guided into the beverage outlet only via the principal beverage passage; and a high flow of beverage is guided into the beverage outlet both via the principal and the overflow beverage passages. Examples of outlet chambers with a partition of this type are disclosed in WO 2012/072758 and WO 2017/001644.

The beverage outlet and the further unit outlet can be confined within a virtual vertical cylinder having a diameter of less than 3 cm, e.g. less than 2 cm. For instance, the outlets are positioned side-by-side and spaced apart or side-by-side right next to each other, or are positioned one within the other. Examples of such configurations are disclosed in WO2011/095502.

BRIEF DESCRIPTION OF THE DRAWINGS

The invention will now be described with reference to the schematic drawings, wherein.

DETAILED DESCRIPTION

Figure 1:
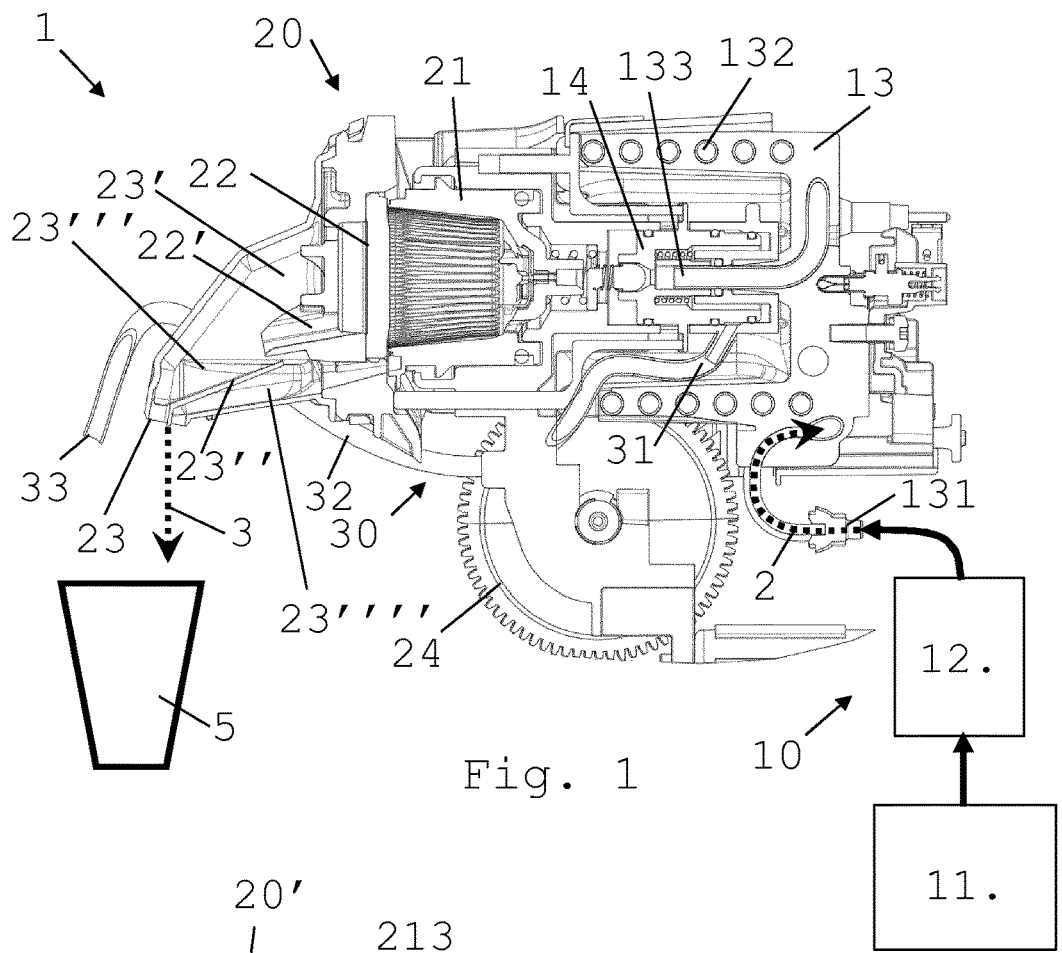
FIG. 1 shows in cross-section and partly schematically part of a beverage machine according to the invention in a configuration for preparing a beverage in its mixing unit and dispensing the prepared beverage therefrom.
Figure 2:
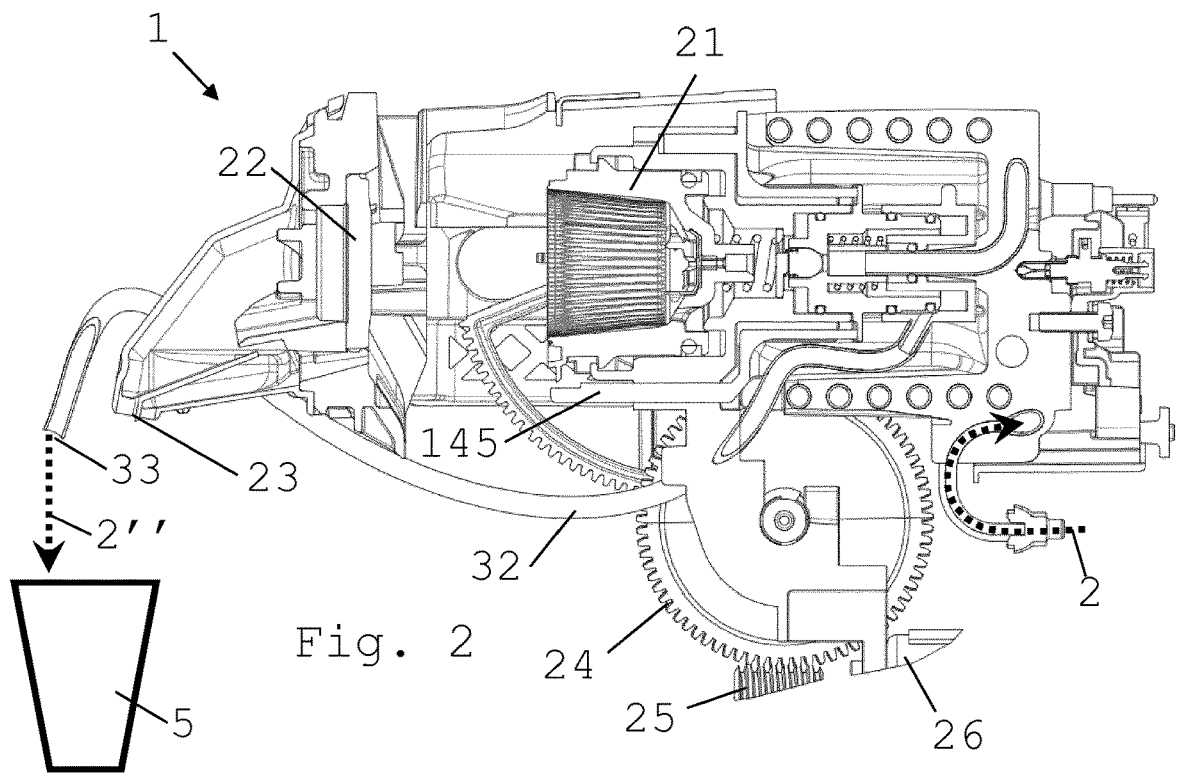
FIG. 2 shows in cross-section part of the beverage machine of FIG. 1 in a configuration for supplying water to a further unit.
Figure 2A:
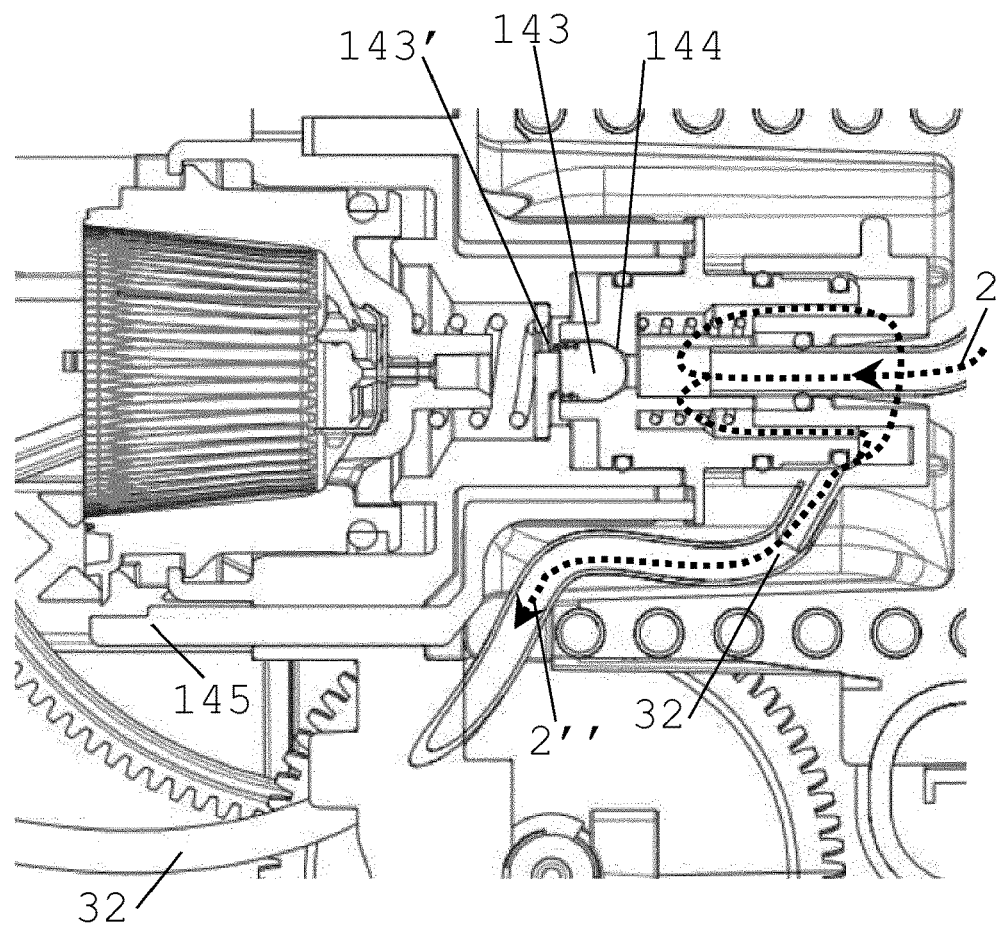
FIG. 2a is an enlarged view of the further unit of FIG. 2 and the supply of water thereto.

FIGS. 1 to 2a, in which the same references generally designate the same elements, illustrate an embodiment of a beverage preparation machine 1 according to the invention.

Machine 1 can be configured for preparing a beverage from an ingredient selected from coffee, tea, cocoa, milk, chocolate and soup.

Machin 1 has a water circuit 12,13 for guiding water 2,2',2" from a source 11, e.g. a tank and/or a water distribution network.

For instance, water circuit 12,13 has at least one of a liquid driver 12, e.g. a pump, and a thermal conditioner 13, e.g. a heater 13 and/or a cooler. Pump 12 can be fluidically connected to a heater 13 for driving water 2 from a heater inlet 131 to a heater outlet 133 via a heating duct 132.

Machine 1 has a mixing unit 20 fluidically connected to water circuit 12,13 and to a beverage outlet 23 for dispensing to a consumer cup or mug 5 a beverage 3 formed in mixing unit 20. Mixing unit 20 has a first module 21 and a second module 22 that are relatively movable from:
- a distant configuration for inserting an ingredient between first and second modules 21,22; to
- a proximate position for holding such ingredient between first and second modules 21,22 and combining the ingredient with water 2' supplied by water circuit 12,13 to mixing unit 20 so as to form beverage 3.

Machine 1 includes a further unit 30 fluidically connected to water circuit 12,13 and to an outlet 33 for dispensing to a consumer cup or mug water 2" supplied by water circuit 12,13 via further unit 30, such as via a pipe 32 of further unit 30 leading to outlet 33. Water 2" may be dispensed as such or in combination with an ingredient mixed with water 2" in further unit 30.

Machine 1 has a water directing device 14 fluidically connected to: water circuit 12,13; mixing unit 20; and further unit 30. Water directing device 14 has one or more valves 141,142;143,144 that can be opened and closed for controlling a flow of water 2,2',2" from water circuit 12,13 selectively into an inlet 211 of mixing unit 20 or into an inlet 31 of further unit 30.

First module 21 and second module 22 may be relatively movable, by a motor 26 and/or a handle, via a transmission such as a transmission comprising at least one of a toothed gear 24,25, lever and belt transmission element.

At least one of first and second modules 21,22, by relatively moving between distant and the proximate configurations, actuates such valve(s) 141,142;143,144 to direct the flow of water selectively into at least one of inlet 21) of mixing unit 20 and inlet 31 of the further unit 30.

Water directing device 14 may be configured to direct the flow of water 2,2',2":
- only into inlet 211 of mixing unit 20 when first and second modules 21,22 are in their proximate configuration and only into inlet 31 of further unit 30 when the first and second modules are in their distant configuration; or
- into the inlet of the mixing unit, and optionally into the inlet of the further unit, when the first and second modules are in their proximate configuration and only into the inlet of the further unit when the first and second modules are in their distant configuration.

Water directing device 30 may include a selector 145 that operates valve(s) 141,142;143,144 for opening and/or closing thereof. Selector 145 can be actuated by at least one of first and second modules 21,22 when relatively moving between the distant and the proximate configurations.

Selector 145 may be associated with a return spring 146 for automatically returning selector 145 into a position to open or close valve(s) 141,142;143,144.

Mixing unit 20 and further unit 30 can have different flow-through resistances. For instance, valve 141,142 of directing device 14 opens and closes inlet 31 of unit 30 with the lower flow-through resistance so that, when valve 141, 142 is open, water 2" from water circuit 13,14 is predominantly directed, e.g. at least almost exclusively directed, into inlet 31 of unit 30 with the lower flow-through resistance.

Figure 1A:
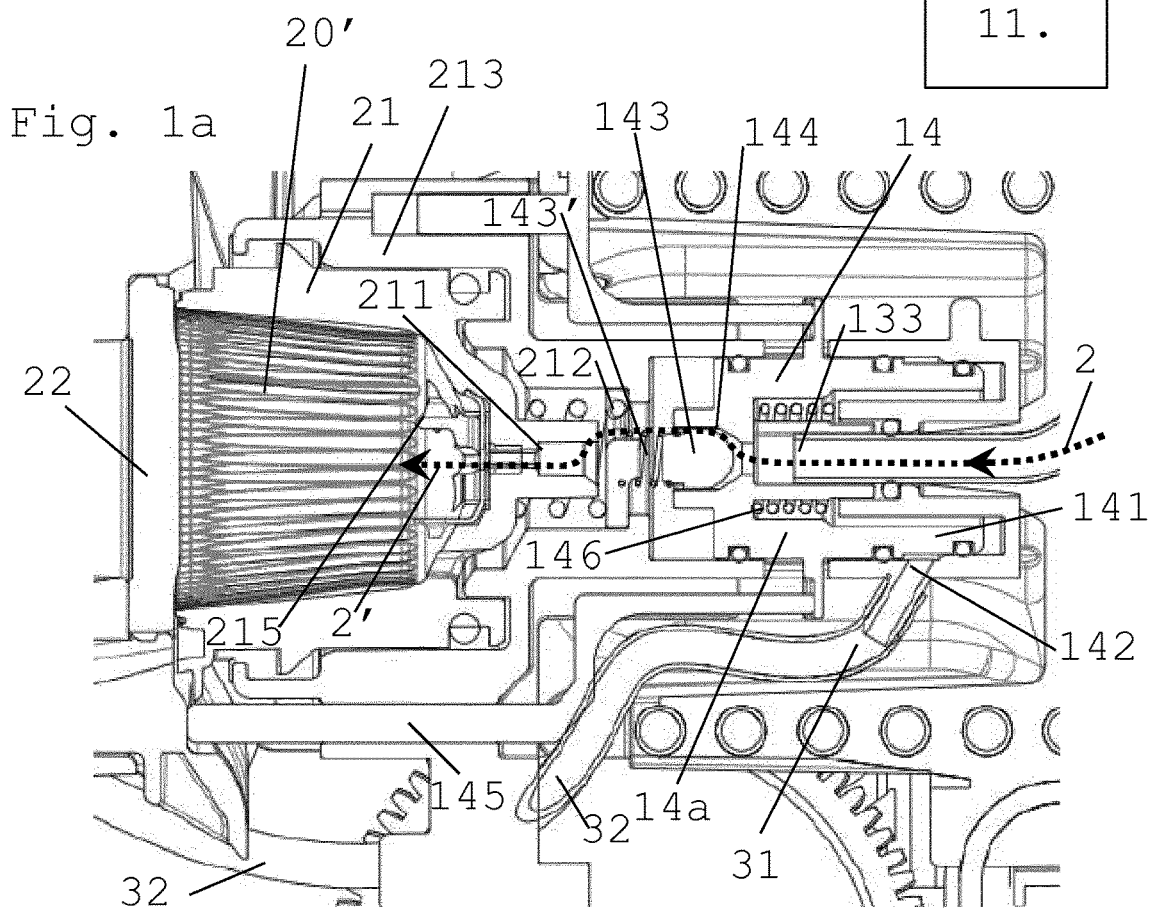
FIG. 1a is an enlarged view of the mixing unit of FIG. 1 and the supply of water thereto.

For instance, unit 20 with the higher flow-through resistance, e.g. mixing unit 20, has an upstream control valve 143,143',144, such as a check-valve or an anti-return valve or a backpressure valve, which enables a flow therethrough of water from the water circuit 12,13 when control valve 143,143',144 is exposed to an upstream-downstream differential valve pressure that exceeds a threshold value. See FIG. 1a.

Such a threshold value can be set above 0.2 bar, e.g. in the range of 0.3 to 15 bar. For instance, the threshold value is comprised with 0.5 to 3 bar or within 5 to 12 bar. Control valve 143,143',144 may include a gate 143 and a resilient element 143', e.g. a spring, that urges the gate 143 into a position sealing an upstream passage 144 into unit 20 with the higher flow-through resistance. See FIG. 2a.

Valve 141,142 of directing device 14 may open and close inlet 31 of further unit 30. Mixing unit 20 can be associated with a mixing unit valve 143,143',144. Water directing device 14 may be configured to maintain, e.g. maintain mechanically, mixing unit valve 143,143',144 closed when valve 141,142 of the directing device 14 is opened so that inlet 31 of the further unit 30 is open.

The mixing unit valve and the upstream control valve can be the same valve 143,143',144.

Directing device 14 can have a body 14a that is movable from:
- a mixing unit position to bring or maintain mixing unit valve 143,143',144 in the closed position and enable valve 141,142 of directing device 14 to be in or move into the open position, optionally body 14a mechanically acting directly on mixing unit valve 143,143',144 to maintain it in the closed position; to
- a further unit position to bring or maintain valve 141,142 of directing device 14 in the closed position and enable mixing unit valve 143,143',144 to be in or move into the open position, optionally body 14a mechanically acting directly on valve 141,142 of directing device 14 to maintain it in the closed position, and/or vice versa.

Body 14a of directing device 14 can have a part that maintains mixing unit valve 143,143',144 and that maintains valve 141,142 of directing device 14, the part of body 14a being an integral part or being made of multiple sub-parts mechanically fixed together.

Body 14a of directing device 14 may be pre-constrained in the mixing unit position and/or in the further unit position, by at least one of a monostable spring element 146 and a bistable spring element.

Selector 145 (when present) can be configured to act on body 14a of directing device 14. For instance, selector 145 is integral with or fixed to or urged against body 14a.

First module 21 and second module 22 may in the proximate position a chamber 20' for holding a capsule containing an ingredient to be mixed in the so delimited chamber 20' with water 2' supplied from water circuit 12,13 to form beverage 3.

First module 21 can have at least one piercing element 215 for opening such capsule so as to enable or facilitate a passage of water 2' into such capsule.

Second module 22 may have at least one piercing element or tearing-open element for forming an opening is such capsule so as to enable or facilitate an outflow from such capsule of beverage 3 produced by mixing the ingredient with water 2'.

First module 21 may be hydraulically and/or resiliently movable against second module 22. First module 21 can be movable against second module 22:
- in a support element, e.g. in a hydraulic cage 213, by a hydraulic fluid, such as water 2' supplied by water circuit 12,13 to first module 21; or
- by a spring element, such as a helicoidal spring 212, mounted on a support element, e.g. a guiding cage 213, against first module 21; or
- by both hydraulic fluid 2' in its corresponding support element 213 and by spring element 212 on its corresponding support element 213, optionally the support element corresponding to hydraulic fluid 2' and the support element corresponding to spring element 212 forming a single element 213.

Water directing device 14 and first module 21 or second module 22 can be mechanically assembled together directly or indirectly via a common support element 213, such as the abovementioned support element 213.

First or second module 21,22 can be a downstream module configured to supply beverage 3 along a guide 22' to beverage outlet 23 via an outlet chamber 23'. For instance, outlet chamber 23' has a partition wall 23" delimiting a principal beverage passage 23''' and an overflow beverage passage 23''''. A low flow of beverage may be guided into beverage outlet 23 only via principal beverage passage 23'''. A high flow of beverage can be guided into beverage outlet 23 both via the principal and the overflow beverage passages 23''',23''''.

Beverage outlet 23 and further unit outlet 33 may be confined within a virtual vertical cylinder having a diameter of less than 3 cm, e.g. less than 2 cm. For instance, outlets 23,33 can be positioned side-by-side spaced apart or right next to each other, or being positioned one within the other.

The invention claimed is:

1. A beverage preparation machine for preparing a beverage, the beverage preparation machine comprising:
   - a water circuit for guiding water from a source, the water circuit comprising at least one of a liquid driver and a thermal conditioner;
   - a mixing unit fluidly connected to the water circuit and to a beverage outlet for dispensing the beverage formed in the mixing unit, the mixing unit having a first module and a second module that are relatively movable from:
     - a distant configuration configured for inserting an ingredient between the first module and the second module; to
     - a proximate configuration configured for holding the ingredient between the first module and the second module and combining the ingredient with the water supplied by the water circuit to the mixing unit to form the beverage;
   - a further unit fluidly connected to the water circuit and to a further unit outlet for dispensing a fluid formed in the further unit; and
   - a water directing device fluidly connected to the water circuit, the mixing unit, and the further unit, the water directing device having one or more valves configured for controlling a flow of water from the water circuit selectively into an inlet of the mixing unit or into an inlet of the further unit; and
   - at least one of the first module and the second module, by relatively moving between the distant configuration and the proximate configuration, actuates the one or more valves to direct the flow of water selectively into at least one of the inlet of the mixing unit and the inlet of the further unit.

2. The beverage preparation machine of claim 1, wherein the water directing device comprises a selector configured to open and/or close the one or more valves, the selector being actuated by at least one of the first module and the second module when relatively moving between the distant configuration and the proximate configuration.

3. The beverage preparation machine of claim 2, wherein the selector is associated with a return spring configured for automatically returning the selector into a position to open and/or close the one or more valves.

4. The beverage preparation machine of claim 1, wherein one of the mixing unit and the further unit has a flow-through resistance lower than a flow-through resistance of the other one of the mixing unit and the further unit, the one or more valves of the water directing device opening and closing the inlet of the one of the mixing unit and the further unit having the lower flow-through resistance so that, when the one or more valves is open, the water from the water circuit is predominantly directed into the inlet of the one or more unit and the further unit having the lower flow-through resistance.

5. The beverage preparation machine of claim 4, wherein the other one of the mixing unit and the further unit having the higher flow-through resistance has an upstream control valve configured to enable a flow of water from the water circuit through the other one of the mixing unit and the further unit when the control valve is exposed to an upstream-downstream differential valve pressure that exceeds a threshold value.

6. The beverage preparation machine of claim 1, wherein when the first module and the second module are in the proximate configuration, the first module and the second module define a chamber for holding a capsule containing the ingredient to be mixed in the chamber with the water supplied from the water circuit to form the beverage.

7. The beverage preparation machine of claim 1, wherein the first module is hydraulically and/or resiliently movable against the second module.

8. The beverage preparation machine of claim 1, wherein the water directing device and one of the first module or the second module are mechanically assembled together directly or indirectly via a common support element.

9. The beverage preparation machine of claim 1, wherein one of the first module or the second module is a downstream module configured to supply the beverage along a guide to the beverage outlet via an outlet chamber.

10. The beverage preparation machine of claim 1, wherein the beverage outlet and the further unit outlet are confined within a virtual vertical cylinder having a diameter of less than 3 cm.

11. The beverage preparation machine of claim 1, wherein the water circuit comprises the liquid driver and the thermal conditioner, the liquid driver comprising a pump, the thermal conditioner comprising a heater, and the pump being fluidly connected to the heater.

12. A beverage preparation machine for preparing a beverage, the beverage preparation machine comprising:
- a water circuit for guiding water from a source, the water circuit comprising at least one of a liquid driver and a thermal conditioner;
- a mixing unit fluidly connected to the water circuit and to a beverage outlet for dispensing the beverage formed in the mixing unit, the mixing unit having a first module and a second module that are relatively movable from:
  - a distant configuration configured for inserting an ingredient between the first module and the second module; to
  - a proximate configuration configured for holding the ingredient between the first module and the second module and combining the ingredient with the water supplied by the water circuit to the mixing unit to form the beverage;
- a further unit fluidly connected to the water circuit and to a further unit outlet for dispensing a fluid formed in the further unit; and
- a water directing device fluidly connected to the water circuit, the mixing unit, and the further unit, the water directing device having one or more valves configured for controlling a flow of water from the water circuit selectively into an inlet of the mixing unit or into an inlet of the further unit; and
- at least one of the first module and the second module, by relatively moving between the distant configuration and the proximate configuration, actuates the one or more valves to direct the flow of water selectively into at least one of the inlet of the mixing unit and the inlet of the further unit;
- wherein the water directing device is configured to direct the flow of water:
  - only into the inlet of the mixing unit when the first module and the second module are in the proximate configuration and only into the inlet of the further unit when the first module and the second module are in the distant configuration; or
  - only into the inlet of the mixing unit when the first module and the second module are in the proximate configuration and only into the inlet of the further unit when the first module and the second module are in the distant configuration.

13. A beverage preparation machine for preparing a beverage, the machine comprising:
- a water circuit for guiding water from a source, the water circuit comprising at least one of a liquid driver and a thermal conditioner;
- a mixing unit fluidly connected to the water circuit and to a beverage outlet for dispensing the beverage formed in the mixing unit, the mixing unit having a first module and a second module that are relatively movable from:
  - a distant configuration configured for inserting an ingredient between the first module and the second module; to
  - a proximate configuration configured for holding the ingredient between the first module and the second module and combining the ingredient with the water supplied by the water circuit to the mixing unit to form the beverage;
- a further unit fluidly connected to the water circuit and to a further unit outlet for dispensing a fluid formed in the further unit; and
- a water directing device fluidly connected to the water circuit, the mixing unit, and the further unit, the water directing device having one or more valves configured for controlling a flow of water from the water circuit selectively into an inlet of the mixing unit or into an inlet of the further unit; and
- at least one of the first module and the second module, by relatively moving between the distant configuration and the proximate configuration, actuates the one or more valves to direct the flow of water selectively into at least one of the inlet of the mixing unit and the inlet of the further unit;
- wherein the one or more valves of the water directing device opens and closes the inlet of the further unit, the mixing unit being associated with a mixing unit valve, and the water directing device being configured to maintain the mixing unit valve in a closed position when the one or more valves of the water directing device is in an open position so that the inlet of the further unit is open.

14. The beverage preparation machine of claim 13, wherein one of the mixing unit and the further unit has a flow-through resistance lower than a flow-through resistance of the other one of the mixing unit and the further unit, wherein the other one of the mixing unit and the further unit having the higher flow-through resistance has an upstream control valve configured to enable a flow of water from the water circuit through the other one of the mixing unit and the further unit when the control valve is exposed to an upstream-downstream differential valve pressure that exceeds a threshold value, and wherein the mixing unit valve and the upstream control valve are the same valve.

15. The beverage preparation machine of claim 13, wherein the water directing device has a body that is movable from:
- a mixing unit position configured to bring or maintain the mixing unit valve in the closed position and to enable the one or more valves of the water directing device to be in or move into the open position; to
- a further unit position configured to bring or maintain the one or more valves of the water directing device in a closed position and enable the mixing unit valve to be in or move into an open position.

16. The beverage preparation machine of claim 15, wherein the water directing device comprises a selector configured to open and/or close the one or more valves, wherein the selector is configured to act on the body of the water directing device, the selector being integral with, fixed to, or urged against the body.

* * * * *